United States Patent
Aher et al.

(10) Patent No.: US 12,531,935 B2
(45) Date of Patent: *Jan. 20, 2026

(54) SYSTEMS AND METHODS FOR IMPROVING NOTIFICATIONS

(71) Applicant: Adeia Guides Inc., San Jose, CA (US)

(72) Inventors: Ankur Anil Aher, Maharashtra (IN); Jeffry Copps Robert Jose, Tamil Nadu (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,433

(22) Filed: Jun. 21, 2024

(65) Prior Publication Data

US 2024/0348700 A1    Oct. 17, 2024

Related U.S. Application Data

(63) Continuation of application No. 17/684,035, filed on Mar. 1, 2022, now Pat. No. 12,058,222.

(51) Int. Cl.
*H04L 67/55*    (2022.01)
(52) U.S. Cl.
CPC .................................. *H04L 67/55* (2022.05)
(58) Field of Classification Search
None
See application file for complete search history.

(56) References Cited

U.S. PATENT DOCUMENTS

| | | | |
|---|---|---|---|
| 7,568,151 B2 * | 7/2009 | Bargeron | G06F 40/166 715/230 |
| 9,507,856 B1 * | 11/2016 | Camplejohn | G06F 16/00 |
| 9,712,664 B1 * | 7/2017 | McMullen | H04M 15/852 |
| 10,142,386 B2 * | 11/2018 | Gordon | H04L 65/756 |
| 10,255,566 B2 * | 4/2019 | Gruber | H04W 4/02 |
| 10,572,842 B1 * | 2/2020 | To | G06Q 30/00 |
| 11,743,356 B2 * | 8/2023 | Ragsdale | H04L 63/0428 |
| 2013/0115927 A1 * | 5/2013 | Gruber | H04W 4/029 455/414.1 |
| 2014/0244765 A1 * | 8/2014 | Smith | H04L 51/222 709/206 |
| 2017/0134516 A1 * | 5/2017 | Gutman | H04L 67/55 |
| 2017/0272485 A1 * | 9/2017 | Gordon | H04N 21/8586 |
| 2019/0215291 A1 * | 7/2019 | Ragsdale | H04L 9/0863 |
| 2024/0273060 A1 * | 8/2024 | Mansfield | H04L 67/55 |

* cited by examiner

*Primary Examiner* — Quang N Nguyen
(74) *Attorney, Agent, or Firm* — HALEY GUILIANO LLP

(57) ABSTRACT

Systems and methods are provided for generating for output a modified notification. A notification is generated. The notification is received at a notification manager running on a first computing device. The notification is modified at the notification manager, thereby creating a modified notification. The modified notification is generated for display.

20 Claims, 12 Drawing Sheets

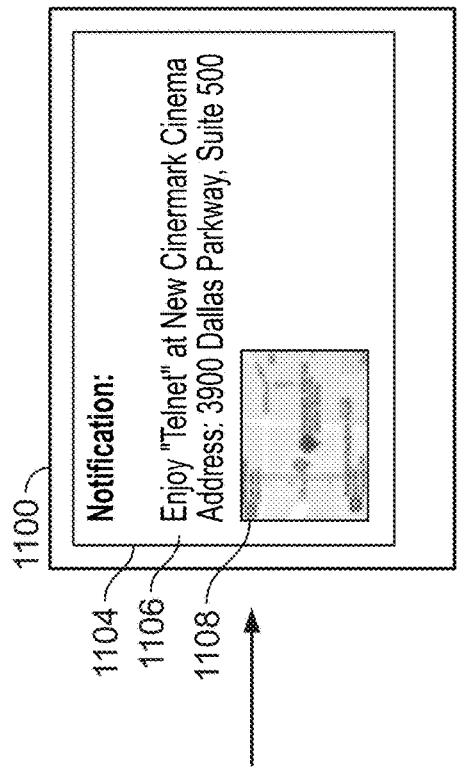
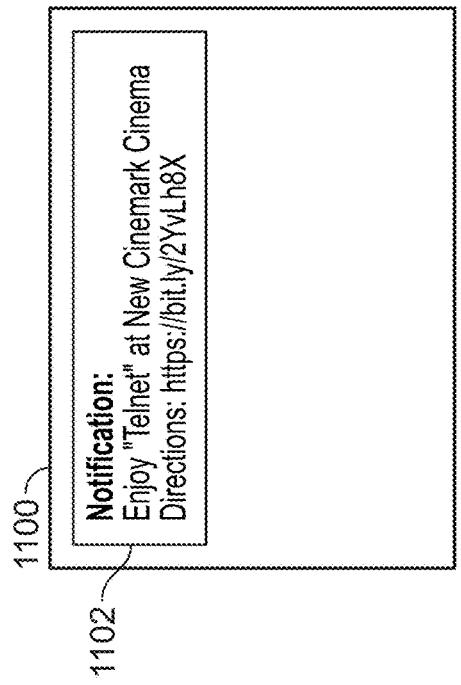
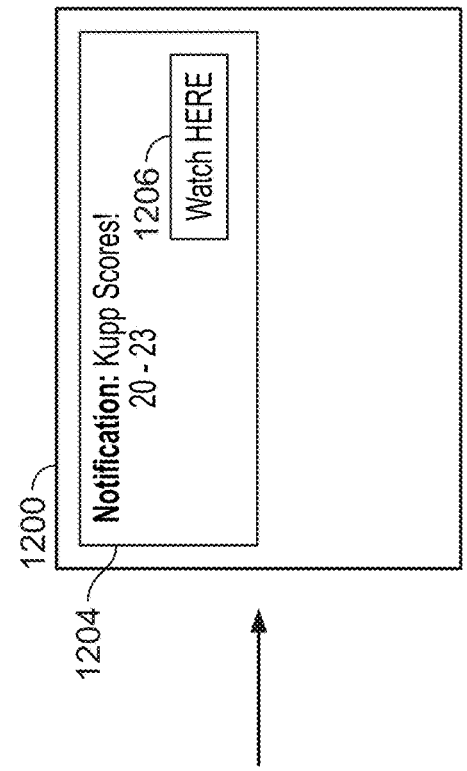
FIG. 11
FIG. 12

SYSTEMS AND METHODS FOR IMPROVING NOTIFICATIONS

CROSS REFERENCE TO RELATED APPLICATIONS

This application is a continuation of U.S. patent application Ser. No. 17/684,035, filed Mar. 1, 2022, now U.S. Pat. No. 12,058,222, issued Aug. 6, 2024, the disclosure of which is hereby incorporated by reference herein in its entirety.

BACKGROUND

The present disclosure is directed towards systems and methods for generating notifications for output at a computing device. In particular, systems and methods are provided herein that modify a received notification at a computing device to generate a modified notification and generate the modified notification for output at a computing device.

SUMMARY

Applications running on computing devices, such as smartphones and smart televisions, generate notifications that are displayed on a computing device in order to notify a user about information. These notifications can relate to almost anything, from a notification indicating that a new message has arrived at the computing device, to notification that a computing device is low on battery, to a notification that a sports team has won a game. Typically, users can prevent notifications generated by an application, including only a subset of notifications, from being displayed at the computing device via a selectable setting. However, these settings tend to be coarse settings and do not accommodate all user preferences with respect to how information is displayed in a notification. In addition, there may be limits placed by, for example, an operating system on a payload size associated with a notification. As such, it may be possible to fit only a limited amount of information in the payload. Furthermore, notifications tend to be static once generated. For example, if a notification is generated by a shopping application that indicates that a promotional discount is available, this notification will continue to be displayed to a user until, for example, it is dismissed. If a user selects the notification, for example, a few days after the notification has been generated, the promotion may no longer be available. Even if an additional notification is sent informing the user that the promotion is no longer available, this additional notification may not be displayed to the user (if, for example, the user has many notifications pending on their computing device), or the user may not make a connection between the initial notification informing them of the promotion and the subsequent notification informing them that the promotion has finished.

In view of the foregoing, it would be beneficial to have a system that is capable of modifying notifications that have been generated by applications before they are generated for output at a computing device.

Systems and methods are described herein for generating modified notifications for output. In accordance with a first aspect of the disclosure, a method is provided. The method includes generating a notification and receiving the notification at a notification manager running on a first computing device. The notification is modified at the notification manager, thereby creating a modified notification. The modified notification is generated for output. In an example system, an application running on a smartphone generates a notification for display. This notification is received by a notification manager running on the smartphone. On receiving the notification, the notification manager modifies the notification. For example, if the notification is notifying a user of a score of a game, the notification manager may modify the notification to include a button and/or icon to enable input that causes the computing device to generate an associated portion of the game for display. Such a button and/or icon may comprise the words "Watch Now." The modified notification is generated for display at the smartphone. In another example system, an application running on a server generates a notification. The notification is received by a notification manager running on the server. On receiving the notification, the notification manager modifies the notification. The modified notification is transmitted via a network, such as the internet, to a tablet device where it is generated for display.

A user preference for displaying a notification comprising a location may be received at the first computing device. Generating the notification may comprise generating a notification comprising a location, and modifying the notification may comprise modifying the notification in accordance with the user preference. In some examples, where the notification manager is running on the same computing device as the computing device on which the notification will be displayed, such as a tablet device, the user preference may be received at a settings section of the tablet device and may be locally accessed by the notification manager. In other examples, where the notification manager is running on, for example, a server, then the user preference may be received at a second computing device, such as a smartphone, and the user preference may be transmitted to the server.

Generating the notification may further comprise generating a notification indicating a change in a score of a game, and modifying the notification may comprise modifying the notification to enable an input to cause a portion of the game associated with the change in score to be generated for display. The notification manager may receive, via a network, subscription data for a service associated with the game, and the notification manager may determine, based on the subscription data, whether a user profile is subscribed to the service. The notification may modify the notification to comprise the portion that enables the input only if it is determined that the user profile is subscribed to the service. In some examples, the portion of the game associated with the change of score may be generated for display at the same computing device as where the input is received, and the notification manager is running. In other examples, the notification manager may be running on a separate computing device to the computing device at which the input is received and the portion of the game is generated for display.

Generating the notification may further comprise generating a notification indicating an action associated with a content item, and the notification manager may receive, via a network, content timing data for the action. Modifying the notification may comprise modifying the notification to enable an input to cause a portion of the content item associated with the action to be generated for display, wherein the portion is based on the received content timing data for the action. In some examples, the portion of the content item associated with the action may be generated for display at the same computing device as where the input is received, and the notification manager is running. In other examples, the notification manager may be running on a separate computing device to the computing device at which the input is received and the portion of the content item is generated for display.

Generating the notification may further comprise generating a notification associated with a portion of a content item, and the notification manager may receive, via a network, a token that enables the portion of the content item to be generated for display. In some examples, the portion of the content item may be generated for display at the same computing device as where the token is received, and the notification manager is running. In other examples, the notification manager may be running on a separate computing device to the computing device at which the portion of the content item is generated for display.

Generating the notification may further comprise generating a notification associated with a category, and the notification manager may identify the category associated with the notification. Modifying the notification may comprise modifying the notification based on the category. In some examples, the category may be promotion, and the notification manager may determine, via a network, a status of the promotion. In response to receiving an input a copy of the promotion identified in the notification may be stored in a memory. In other examples, the category may be news, and the notification manager may determine, via a network, a news source to subscribe to in order to receive updates associated with the notification. Modifying the notification may comprise modifying the notification to enable an input to subscribe to the news source to receive updates associated with the notification. In some examples, the input may be received at the same computing device as where the notification manager is running, and the modified notification is generated for output. In other examples, the notification manager may be running on a separate computing device to the computing device at which the input is received and the modified notification is generated for output.

The notification manager may identify a context of the computing device. The computing device may be the first computing device on which the notification manager runs or may be a second computing device. The notification manager may compare the identified context of the computing device with the modified notification. The notification manager may determine whether to queue the modified notification, based on the identified context, such that the modified notification is generated for display at an appropriate time.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and case of illustration these drawings are not necessarily made to scale.

The above and other objects and advantages of the disclosure may be apparent upon consideration of the following detailed description, taken in conjunction with the accompanying drawings, in which:

FIG. 11 shows an example modified notification, in accordance with some embodiments of the disclosure;

FIG. 12 shows another example modified notification, in accordance with some embodiments of the disclosure;

Figure 15:
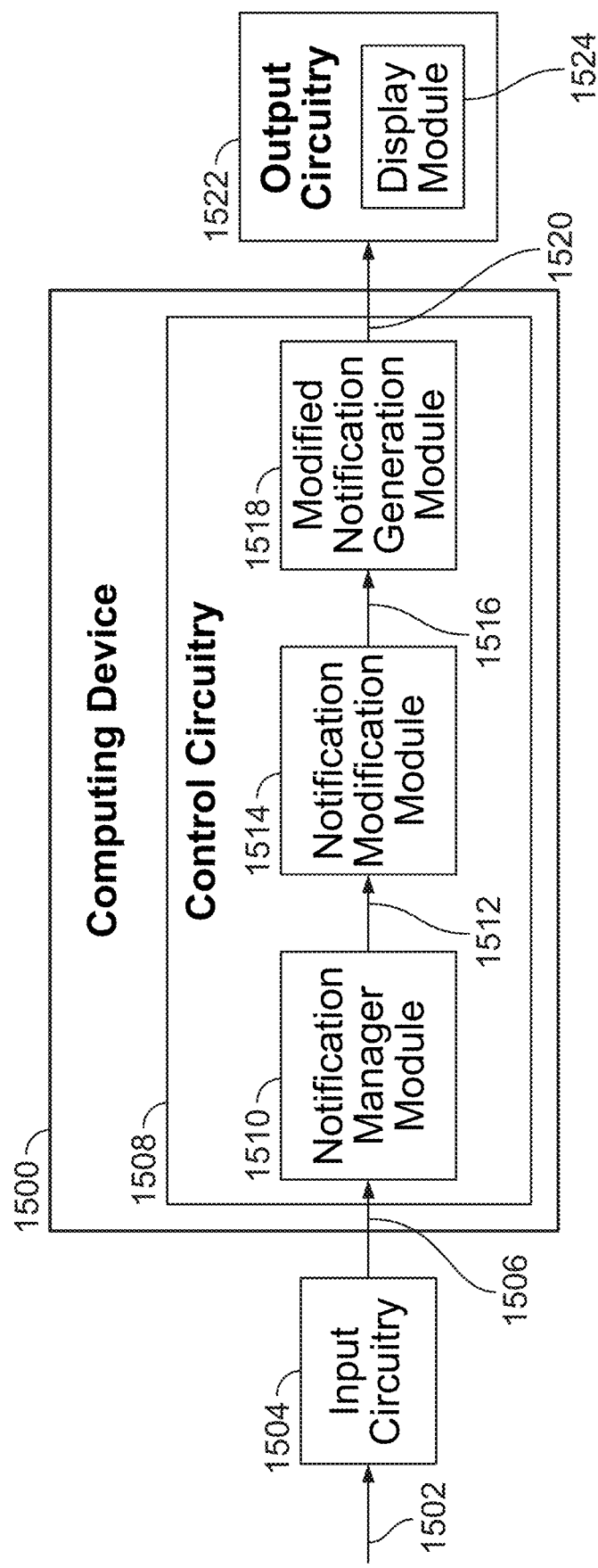
Figure 16:
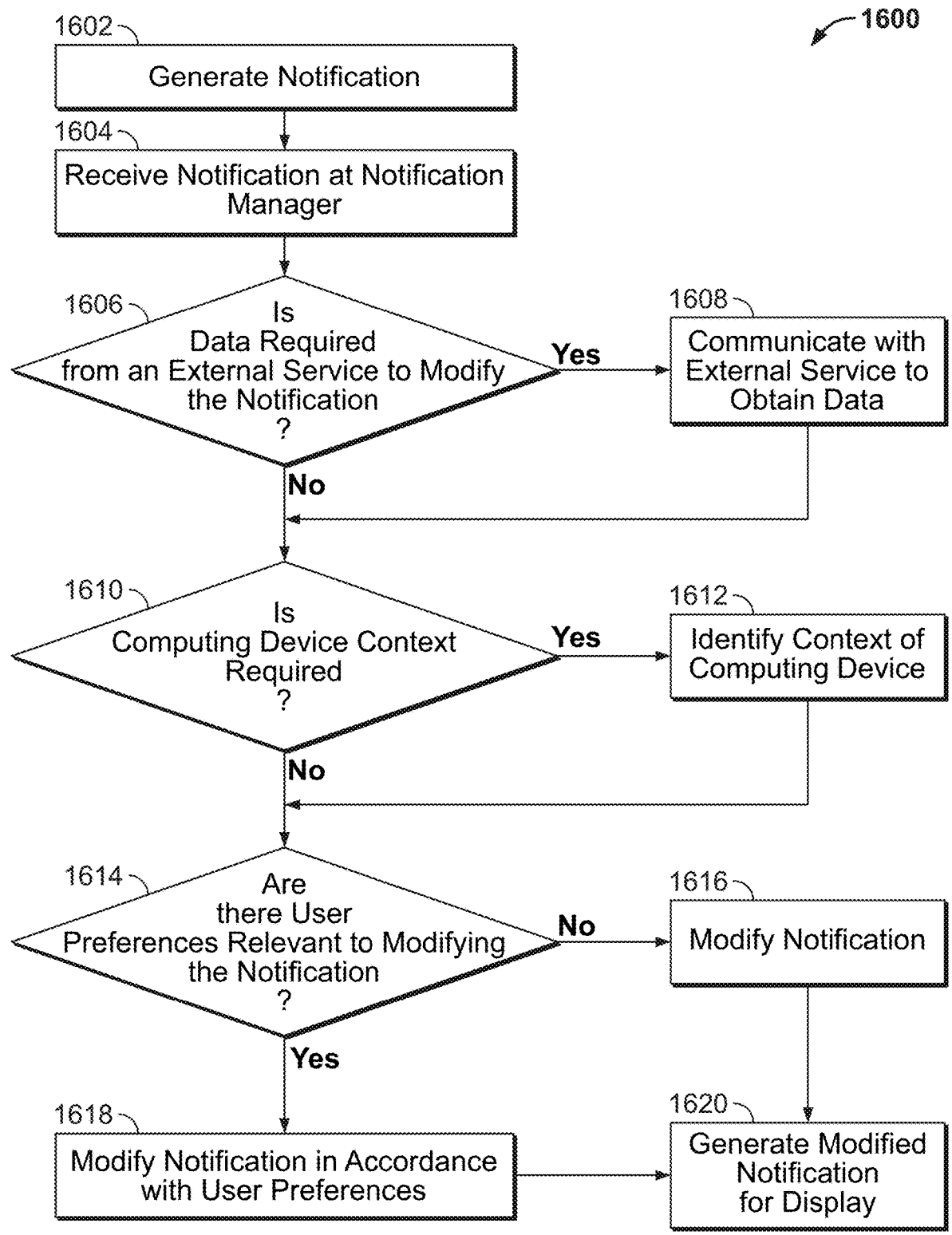

FIG. 15 shows a block diagram representing components of a computing device and data flow therebetween for modifying a notification to generate a modified notification, in accordance with some embodiments of the disclosure; and FIG. 16 shows a flowchart of illustrative steps involved in modifying a notification to generate a modified notification, in accordance with some embodiments of the disclosure.

DETAILED DESCRIPTION

Systems and methods are described herein for generating modified notifications for output. Different types of notifications may be modified, types of notification include, for example, notifications related to promotions, news, and/or game scores. A notification manager may be implemented on a computing device and may be in communication with various web services, such that the notification manager can modify a notification to produce a smart notification. The modification of a notification by the notification manager may be based on the type of the notification, the content of the notification, and/or a user profile, including, for example, user subscriptions and/or entitlements to access different content sources.

A notification is typically based on information that is generated by an application running on a computing device. In some examples, a notification may be generated at a first computing device and may be transmitted, via a network, to a second computing device. A notification generated by an application is typically passed to a notification manager of an operating system running on the computing device. The notification manager takes the notification and generates it for display via a user interface (UI) that is controlled by the operating system, rather than the application. As such, notifications displayed on a computing device running the operating system tend to look similar, as they share the UI components. Notifications can be used to display any type of message, including, for example, reminders, communications from other people and/or other information from an application. Typically, an input can be received via a notification, for example, a touch event at a notification and, in response to the input, an application associated with the notification can be accessed and/or an action associated with the notification can be performed. A notification manager comprises any component of an operating system that takes notifications from applications, or other sources, and generates them for display at the computing device on which the operating system is running. In some examples, a notification may be generated for audible output at, for example, a smart speaker. In this example, the notification may not be generated for display and may, for example, comprise only an audible output.

Generating for output includes generating for display, generating for audio output and generating for a combination of display and audio output. Enabling an input includes enabling a touch event to be received via a notification and/or via a portion of a notification, such as by an icon and/or a button. In other examples, an input may be received via an input device, such as a keyboard, mouse, microphone and/or virtual reality glove. Content includes audio, video and/or any other media content. Audio includes audio-only content, such as podcasts, stories and music. Video includes audiovisual content such as movies and/or television programs. An over-the-top content platform may be accessed via a website and/or an app running on a computing device and may receive any type of media content, including live media content and/or on-demand media content.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

The figures below describe environments comprising more than one application, and the applications have different locations associated with them. These are for example only, and embodiments comprising a single application, for example, running on a computing device on which the notification manager is running, or on a separate computing device to which the notification manager is running are contemplated as well. Any of the below environments may comprise any number of applications, in different locations or the same location, in communication with the notification manager.

Figure 1:
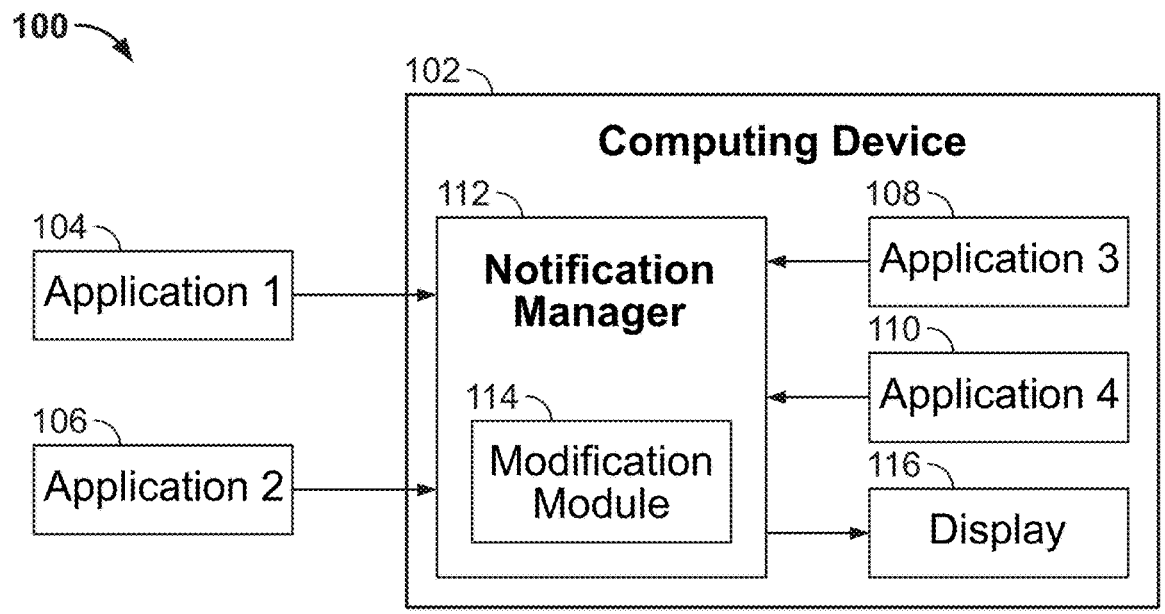
FIG. 1 shows an example environment in which a notification is modified to generate a modified notification, in accordance with some embodiments of the disclosure.

FIG. 1 shows an example environment in which a notification is modified to generate a modified notification, in accordance with some embodiments of the disclosure. The environment 100 comprises a computing device 102, a first application 104, a second application 106, a third application 108 and a fourth application 110. The computing device 102 comprises a notification manager 112, a modification module 114 and a display 116. An application 104, 106, 108, 110 generates a notification. For example, application 104 may be a news aggregation service and may generate notifications relating to news stories. Application 106 may be a sports aggregation service and may generate notifications relating to games. Application 108 may be a fitness application that is in communication with a computing device such as a smart watch and may generate notifications suggesting that a user of the smart watch be more active. Application 110 may be an email client and may generate notifications when a new email is received. If the application 104, 106 is running on a computing device external to the computing device 102, the generated notification is transmitted to the computing device 102 via a network, such as the internet and/or a home network, where it is received by the notification manager 112. The network may comprise wired and/or wireless means for transmitting the notification to the computing device 102. The application 104, 106 may be running a computing device such as a smartphone, tablet and/or smart television that is connected to the same home network as the computing device 102. In another example, the application 104, 106 may be running on a server remote from the computing device 102. The server may be a physical server or may be a virtual machine running on a physical server. Applications 108, 110 run on the computing device 102 itself. The generated notification is transmitted from the application 108, 110 to the notification manager 112. The data and/or trigger for the application 108, 110 to generate a notification may be generated by the application 108, 110 itself. In another example, the application 108, 110 may receive data and/or a trigger via a network, such as the internet and/or a home network, and the application 108, 110 may generate a notification based on the received data and/or trigger.

Once the notification is received at the notification manager 112, a modification module 114 of the notification manager 112 modifies the notification to create a modified notification. Examples of how notifications may be modified are detailed previously and subsequently. Typical modifications include expanding or contracting information contained in the notification, adding an icon to the notification, adding a data field to the notification and/or enabling additional input to be received via the notification. The notification manager generates the modified notification for output, in this case for display, at a display 116 of the computing device. In other examples, the modified notification may be generated for audible output in addition to, or alternatively to, displaying the modified notification. In this example, the notification manager 112 runs on the same computing device 102 at which the modified notification is generated for display. In similar examples, the notification manager 112 may run on a computing device remote to the computing device 102, and the modified notification may be transmitted to computing device 102, where it is generated for display.

In some examples, the notification manager 112 may run on the same computing device as the first and/or second applications 104, 106. In other examples, the notification manager 112 may run on an entirely separate computing device and a notification from the first, second, third and/or fourth applications 104, 106, 108, 110 may be transmitted via a network, such as the internet, to the notification manager 112 and the modified notification may be transmitted via the network to the computing device 102. In all subsequent figures, it is contemplated that the notification manager may run on a computing device separate to the computing device at which the modified notification is displayed, and the modified notification may be transmitted via a network, such as the internet, to the computing device at which the modified notification is displayed.

Figure 2:
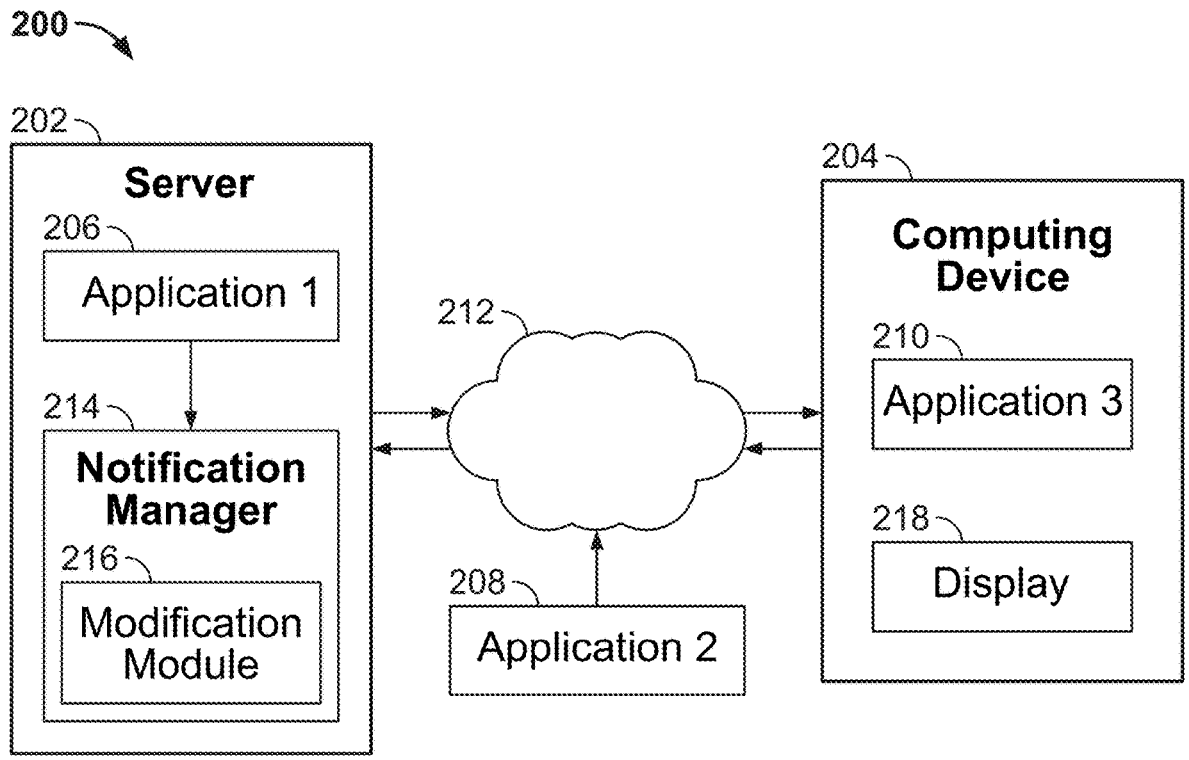
FIG. 2 shows another example environment in which a notification is modified to generate a modified notification, in accordance with some embodiments of the disclosure.

FIG. 2 shows another example environment in which a notification is modified to generate a modified notification, in accordance with some embodiments of the disclosure. In a similar manner to the environment depicted in FIG. 1, the environment 200 comprises a first computing device, such as server 202, a second computing device, such as computing device 204, a first application 206 running on server 202, a second application 208 in communication with the server 202, and a third application 210 running on computing device 204. The server 202 comprises a notification manager 214 and a modification module 216. The first application 206 may run on the server 202 and be in communication with notification manager 214. The second application 208 may be in communication with the notification manager 214 via a network 212, such as the internet. Computing device 204 comprises a display 218, and the third application 210 may run on the computing device 204. The third application 210 may be in communication with the notification manager 214 via the network 212. Once a notification is received at the notification manager 214, a modification module 216 of the notification manager 214 modifies the notification to create a modified notification. The modified notification is transmitted via the network 212, to the computing device 204. The modified notification is generated for display at the computing device 204 and is displayed on a display 218 of the computing device 204.

Figure 3:
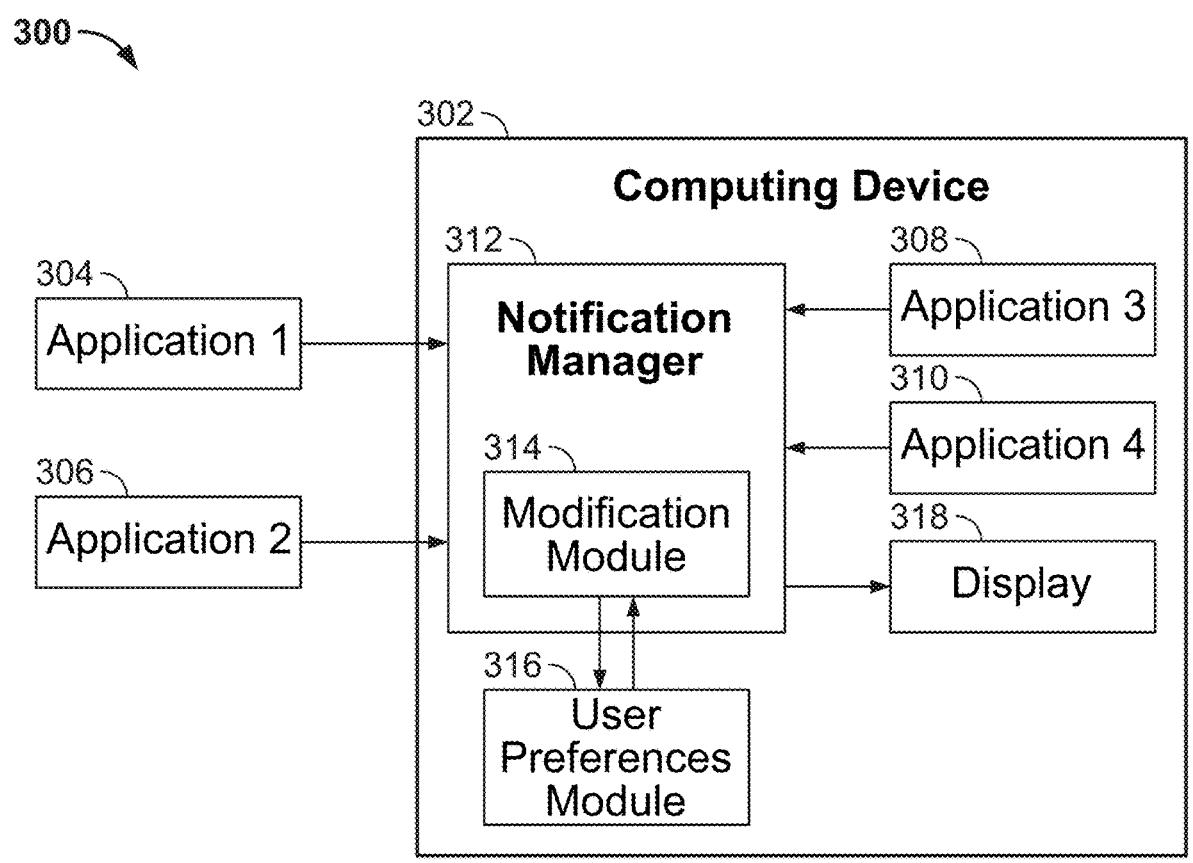
FIG. 3 shows another example environment in which a notification is modified to generate a modified notification, in accordance with some embodiments of the disclosure.

FIG. 3 shows another example environment in which a notification is modified to generate a modified notification, in accordance with some embodiments of the disclosure. In a similar manner to the environments depicted in FIGS. 1 and 2, the environment 300 comprises a computing device 302, a first application 304, a second application 306, a third application 308 and a fourth application 310. The computing device 302 comprises a notification manager 312, a modification module 314 and a display 318. In addition, the computing device 302 comprises a user preferences module 316. A user may indicate a user preference for how notifications are displayed on computing device 302. The user preferences module 316 is in communication with the modification module 314, such that the modification module 314 modifies the notifications in accordance with the user preference, or preferences. For example, a user preference may be set such that notifications comprising a location always display an address associated with the location. In such an example, when the modification module 314 receives a notification, the modification module 314 analyzes the notification to determine whether the notification comprises a location. If the notification comprises a location, but not an address associated with the notification, then the modification module 314 may modify the notification to include an address associated with the notification. In some examples, the modification module 314 may communicate, via a network such as the internet, with an address look-up service in order to determine an address for a location. As before, the modified notification is generated for display and is displayed on a display 318 of the computing device 302.

In some examples, a user preference may be determined by analyzing a user's past behaviors with respect to notifications comprising different location representations. For example, it may be determined whether a notification has been clicked and/or read or discarded and/or whether a user has visited a location indicated in a notification. The user preferences may also include an option to enable locations and/or directions to be displayed in a notification with respect to another location, for example, a current location of the computing device and/or a fixed location, such as an identified home address. The location may be determined automatically by analyzing past movement of the computing device. In some examples, where the notification manager 312 is running on the same computing device as the computing device 302 on which the notification will be displayed, such as a tablet device, the user preference may be received at a settings section of the tablet device and may be locally accessed by the notification manager 312. In other examples, where the notification manager 312 is running on, for example, a server, then the user preference may be received at a second computing device, such as a smartphone, and the user preference may be transmitted to the server.

Figure 4:
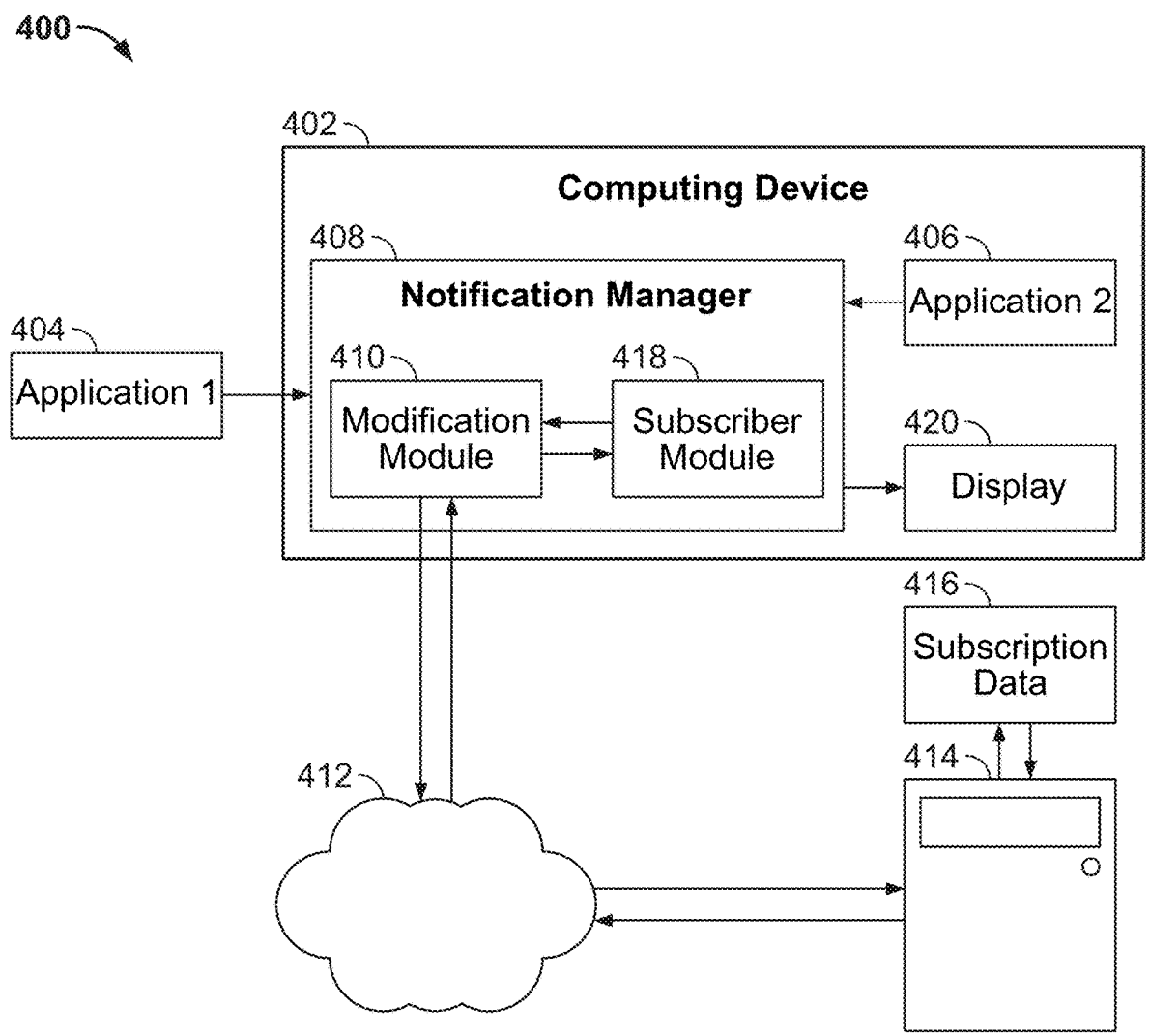
FIG. 4 shows another example environment in which a notification is modified to generate a modified notification, in accordance with some embodiments of the disclosure.

FIG. 4 shows another example environment in which a notification is modified to generate a modified notification, in accordance with some embodiments of the disclosure. In a similar manner to the environments depicted in FIGS. 1-3, the environment 400 comprises a computing device 402, a first application 404 and a second application 406. The computing device 402 comprises a notification manager 408, a modification module 410 and a display 420. In addition, the computing device 402 is in communication, via a network 412 (such as the internet), with a server 414. The server 414 comprises a database of subscription data 416, and the notification manager comprises a subscription module 418. On identifying a modification to a notification that may require a user profile associated with the computing device 402 to be subscribed to a service, the modification module sends a query, via the network 412, to server 414. The query may comprise, for example, data identifying a user profile and data identifying a relevant service. On receiving the query, the server 414 queries a subscription database 416 in order to identify whether the user profile is subscribed to the relevant service. The server 414 transmits the results of the query back to the computing device 402, where they are passed to the subscriber module 418. If the user profile is not subscribed to the relevant service, then the notification is modified to include a modification that requires the user profile to be subscribed to the service and, as before, the modified notification is generated for display and is displayed at a display 420 of the computing device 402.

For example, a sports application may generate a notification associated with a change in score of a game, such as an NFL game. In another example, an over-the-top (OTT) provider can provide a service than enables score changes in a game to be received by the notification manager 408. On receiving the notification, the modification module 410 may identify that a portion of content associated with the change in score, e.g., a touchdown being scored, is available to display at the computing device 402; however, to display the portion of content, the user must be subscribed to an OTT service. If the user is subscribed to the relevant OTT service, as identified via the server 414, then the notification may be modified to include a "Watch touchdown" button and/or icon. In some examples, subscription data is provided via the OTT service. The notification comprising the button and/or icon is generated for display and is displayed at the computing device 402. On receiving input, such as a touch event, indicating that the button and/or icon has been selected, the computing device 402 may open, for example, an application associated with the OTT service and may generate the portion of content for display.

In another example, a notification received at a mobile device in proximity to a smart television can be modified with a "Watch touchdown on smart television" button and/or icon. In another example, a smart television may have a picture in picture (PiP) mode, and a notification received at the smart television may be modified with a "Watch touchdown in PiP" button and/or icon. In some examples, the subscription may be to a channel associated with the game and electronic program guide (EPG) data, which may be utilized to determine which channel the game is being transmitted on.

Figure 5:
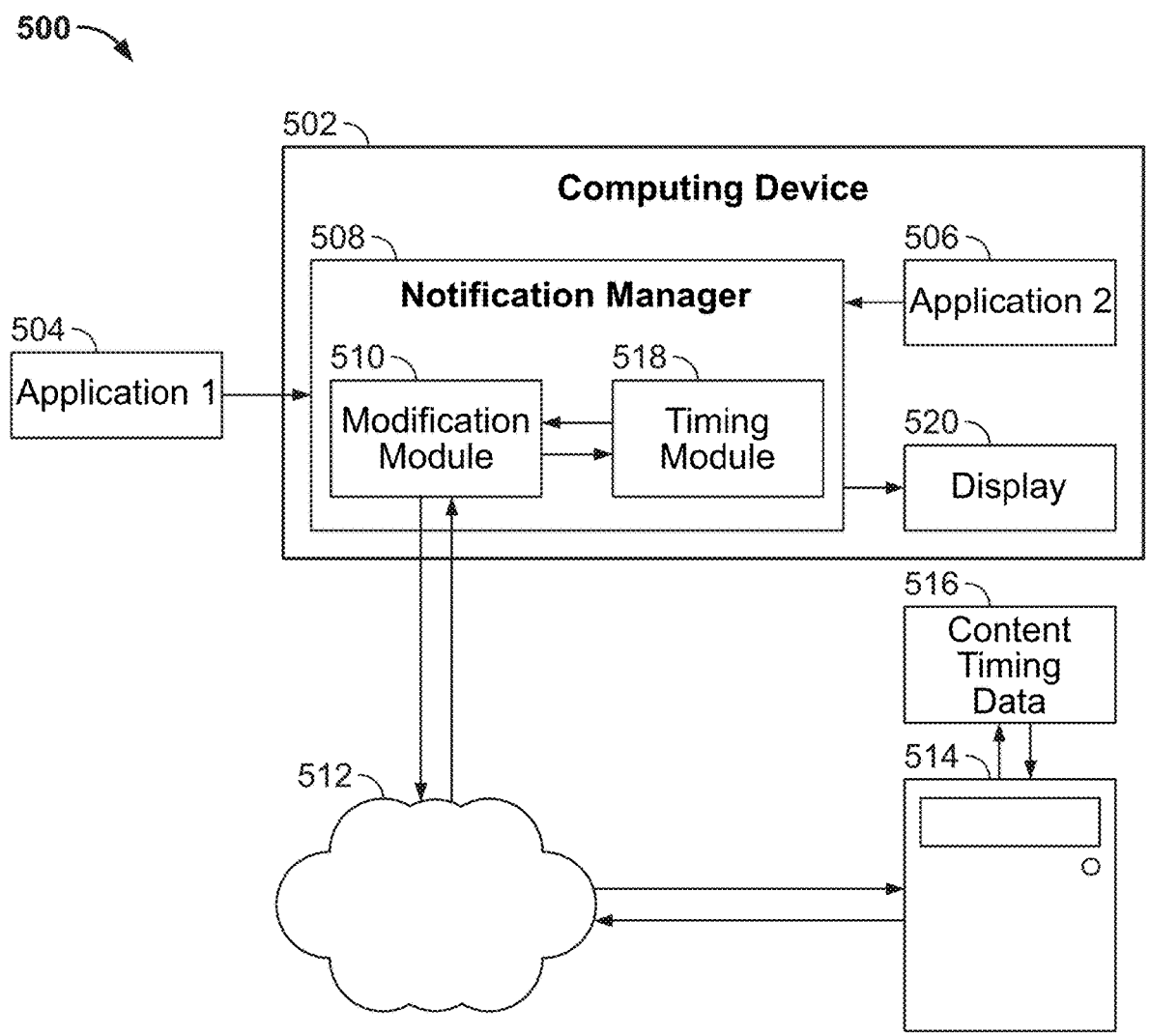
FIG. 5 shows another example environment in which a notification is modified to generate a modified notification, in accordance with some embodiments of the disclosure.

FIG. 5 shows another example environment in which a notification is modified to generate a modified notification, in accordance with some embodiments of the disclosure. In a similar manner to the environments depicted in FIGS. 1-4, the environment 500 comprises a computing device 502, a first application 504 and a second application 506. The computing device 502 comprises a notification manager 508, a modification module 510 and a display 520. In addition, the computing device 502 is in communication, via a network 512 (such as the internet), with a server 514. The server 514 comprises a database of content timing data 516, and the notification manager comprises a timing module 518. On identifying a modification to a notification that may require further information about content timing, the modification module sends a query, via the network 512, to server 514. The query may comprise, for example, data identifying a content item and data identifying an event in the content item. On receiving the query, the server 514 queries a content timing database 516 in order to identify a time associated with the event in the content item. The server 514 transmits the results of the query back to the computing device 502, where they are passed to the timing module 518. The notification is modified to include a modification that requires the timing data associated with a content item and, as before, the modified notification is generated for display and is displayed at a display 520 of the computing device 502.

For example, a news application may generate a notification associated with a breaking news story. On receiving the notification, the modification module 510 may generate a query, for transmission to the server 514, querying a time period associated with the breaking news event on a live news broadcast. The server 514 may query the content timing database 516 to identify the time period and may transmit the results of the query to the computing device 502. The timing module 518 may receive the results of the query and they may be used to generate a modified notification. The notification may be modified to include a "Watch breaking news" button and/or icon. The notification comprising the button and/or icon is generated for display and is displayed at the computing device 502. On receiving input, such as a touch event, indicating that the button and/or icon has been selected, the computing device 502 may open, for example, an application associated with the news service and may generate the portion of content for display.

Any button and/or icon that is included in a notification may be deep-linked to appropriate content and/or a segment and/or portion of a content item. For example, many OTT services allow users to control live television (e.g., pause and rewind), and the content may be stored on servers at least for the duration of a live program. The modification module may access the stored content and use the time of a notification to construct and/or to create a deep link. For example, if a notification of a change in score occurred at 30 minutes into a broadcast, then the modification module may create a deep link from minute 28 to the current time. Content that can be deep-linked into, by the modification module, may be analyzed in real time by, for example, an application running on a server remote to the computing device to determine the type of alerts that can be created, for example, using computer vision and machine learning algorithms to determine, for example, that a team scored and/or a player intercepted a pass. Timing associated with such analysis can be used to construct a concise deep link to include only the play related to the notification. Similarly, the modification module can create a deep link based on user, or profile, preferences or predefined rules based on the type of action addressed by the alert. For example, the user might have a preference for two-minute clips of content.

Figure 6:
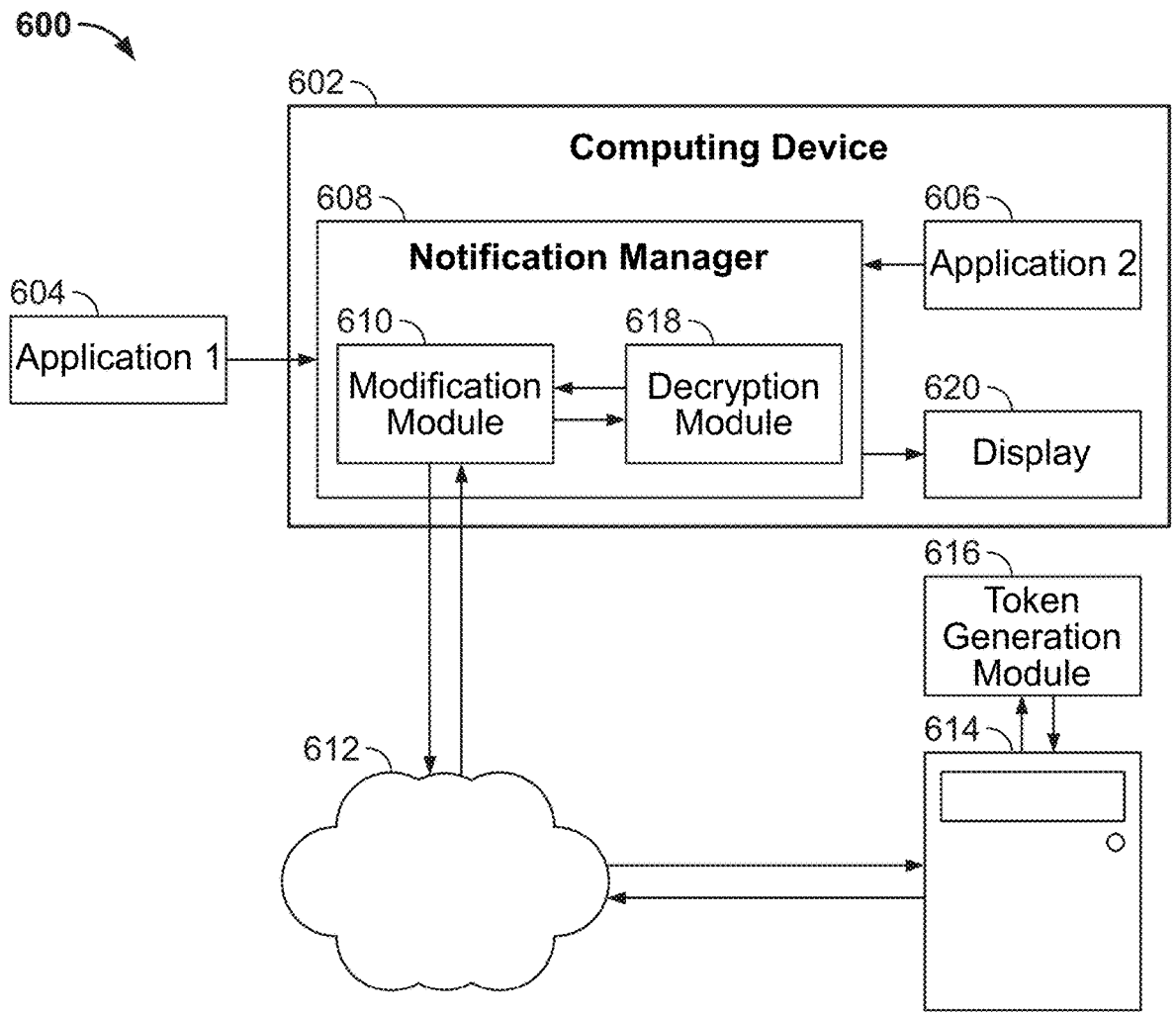
FIG. 6 shows another example environment in which a notification is modified to generate a modified notification, in accordance with some embodiments of the disclosure.

FIG. 6 shows another example environment in which a notification is modified to generate a modified notification, in accordance with some embodiments of the disclosure. In a similar manner to the environments depicted in FIGS. 1-5, the environment 600 comprises a computing device 602, a first application 604 and a second application 606. The computing device 602 comprises a notification manager 608, a modification module 610 and a display 620. In addition, the computing device 602 is in communication, via a network 612 (such as the internet), with a server 614. The server 614 comprises a token generation module 616, and the notification manager comprises a decryption module 618. On identifying a modification to a notification that may require access to a service that requires authentication, the modification module sends a request, via the network 612, to server 614. The query may comprise, for example, an authentication request for an identified service. On receiving the request, the server 614 requests a token from a token generation module 616 in order to receive a token for accessing the identified service. The server 614 transmits the token to the computing device 602, where it is passed to the decryption module 618. The notification is modified to include a modification that requires access to an authenticated service; as before, the modified notification is generated for display and is displayed at a display 620 of the computing device 602.

For example, an OTT application may generate a notification associated with a new episode of a series. On receiving the notification, the modification module 610 may generate a request, for transmission to the server 614, requesting a token to access content via the OTT application. The server 614 may request a token from the token generation module 616 and may transmit the token to the computing device 602. The decryption module 618 may receive the token and it may be used to generate a modified notification. The notification may be modified to include a "Watch episode" button and/or icon. The notification comprising the button and/or icon is generated for display and is displayed at the computing device 602. On receiving input, such as a touch event, indicating that the button and/or icon has been selected, the computing device 602 may open, for example, an application associated with the news service and may generate the portion of content for display. In other examples, the token may grant temporary access to content and/or a content delivery service to enable a user to watch a content item, or a portion of a content item, associated with a notification.

The modification module can communicate with an authorization and/or digital rights management service associated with the OTT service to authenticate the user and obtain any needed keys that a player running on the computing device needs for decrypting content for playback. Such license/keys can be obtained once the user plays the first clip and used for any notification associated with, for example, a particular game and/or for a particular duration. Additionally, single sign-on (SSO) data (e.g., stored at the user device) can be used by the modification module to authenticate the user.

Figure 7:
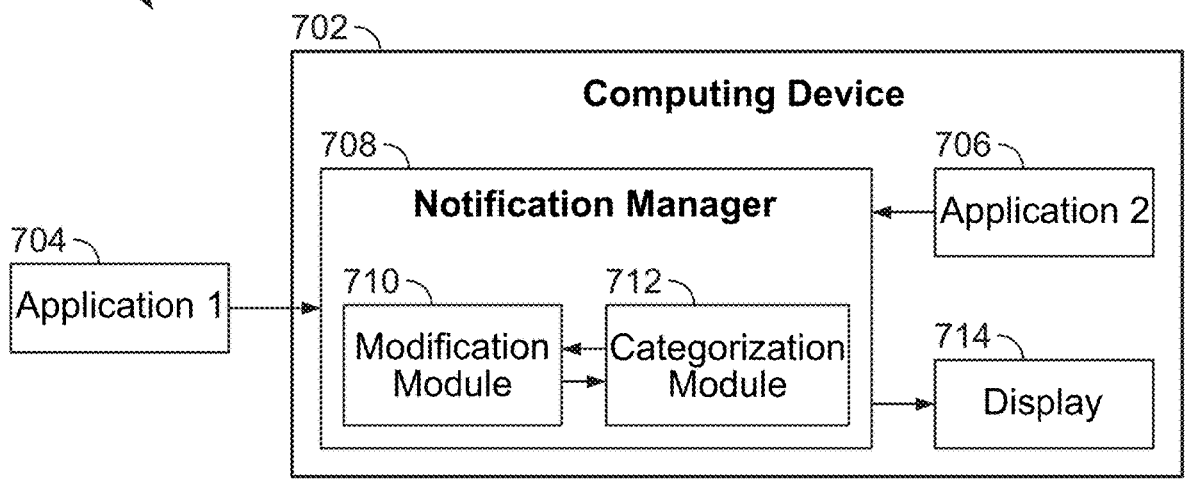
FIG. 7 shows another example environment in which a notification is modified to generate a modified notification, in accordance with some embodiments of the disclosure.

FIG. 7 shows another example environment in which a notification is modified to generate a modified notification, in accordance with some embodiments of the disclosure. In a similar manner to the environments depicted in FIGS. 1-6, the environment 700 comprises a computing device 702, a first application 704 and a second application 706. The computing device 702 comprises a notification manager 708, a modification module 710 and a display 714. In addition, the computing device 702 comprises a categorization module 712. On receiving a notification at the notification manager 708, the notification is analyzed by the categorization module 712, which applies a categorization to the notification. For example, the notification could be categorized as "promotion," "sport," "news," and/or "OTT content". The categorization may be based on metadata associated with the notification, natural language processing and/or based on a category of application that the notification is received from. The modification module 710 modifies the notification based on the category associated with the notification.

Figure 8:
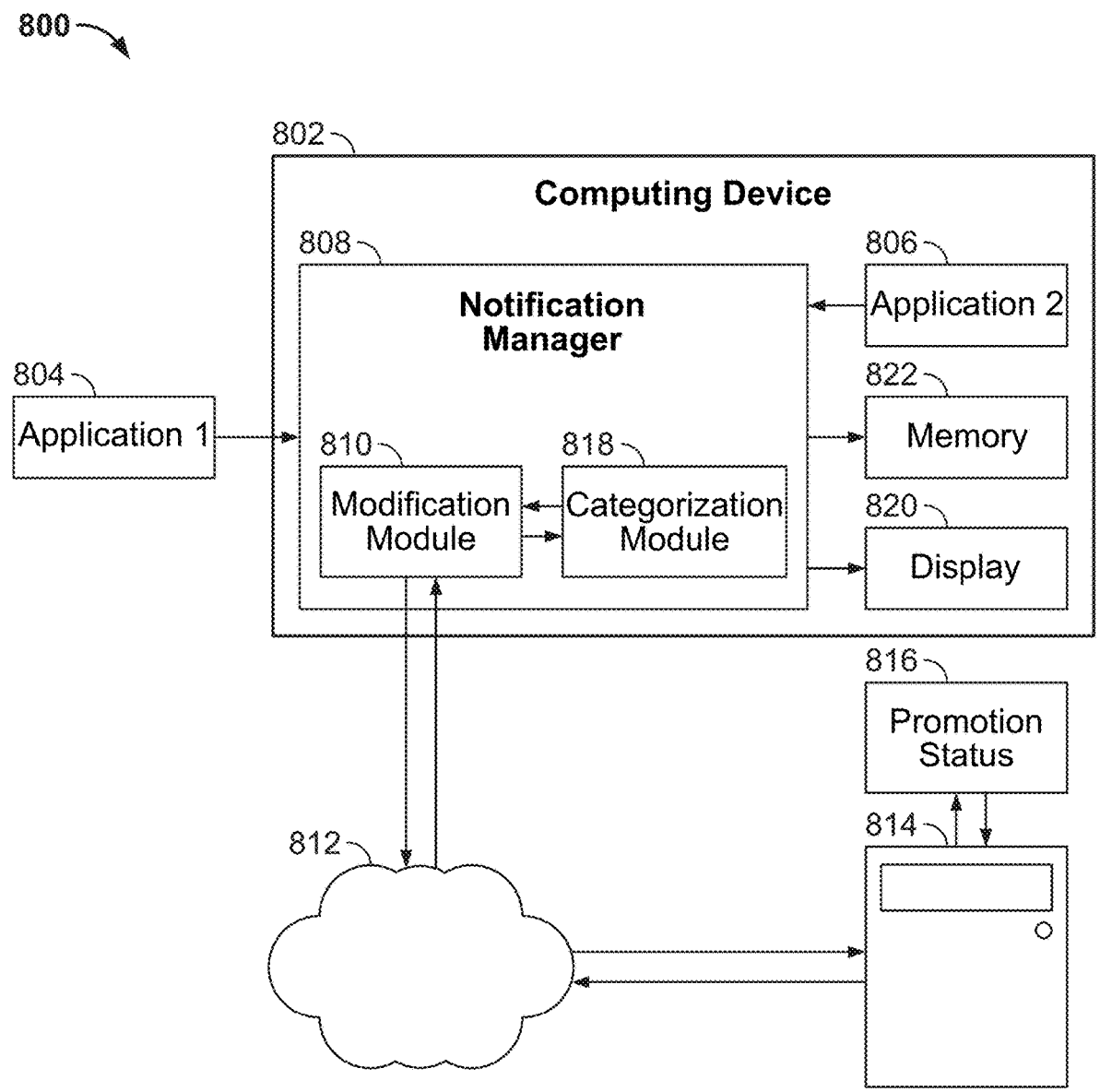
FIG. 8 shows another example environment in which a notification is modified to generate a modified notification, in accordance with some embodiments of the disclosure.

FIG. 8 shows another example environment in which a notification is modified to generate a modified notification, in accordance with some embodiments of the disclosure. In a similar manner to the environments depicted in FIGS. 1-7, the environment 800 comprises a computing device 802, a first application 804 and a second application 806. The computing device 802 comprises a notification manager 808, a modification module 810 and a display 820. In addition, the computing device 802 is in communication, via a network 812 (such as the internet), with a server 814. The server 814 comprises a promotion status database 816, and the notification manager comprises a categorization module 818. In addition, the memory 822 of the computing device is explicitly shown in this example. In a similar manner to the computing device 702 shown in FIG. 7, the computing device 802 categorizes a notification received from an application, for example, a shopping application. On categorizing a notification as, for example, "promotion," the modification module sends a query, via a network 812 (such as the internet), to determine a status of the promotion. The query may comprise, for example, a request to determine whether the promotion is still valid and how long it is valid for. On receiving the request, the server 814 requests the data from the promotion status database 816. The server 814 transmits the requested data to the computing device 802, where it is passed to the modification module 810. The notification is modified to include a selectable icon and/or button that enables the user to save the promotion to the memory 822 of the computing device. As before, the modified notification is generated for display and is displayed at a display 820 of the computing device 802.

A notification of the type "promotion" may be modified to display a store locator icon whose value is populated when the notification is accessed by the user for the purpose of using it or when the user explicitly queries for it (e.g., by clicking on the icon). The value is then retrieved based on the location of the device (e.g., the nearest store that is associated with the notification). Similarly, a "redeem" icon may only be displayed in response to determining that the user needs to redeem a deal in the notification, for example, when it is determined that the device is at a particular store, such as Walmart. Such determination can be done using any location service running on the computing device, including receiving data via GPS, GLONASS, Galileo, Wi-Fi scanning and/or Bluetooth scanning.

The status of a promotion may be verified at any time (e.g., when the user opens the notification) or whenever the user desires to check the status of any notification received that comprises a promotion. Users may be able to clip any notification that they are interested in for later use, for example, if the notification contains promotional material and the notification is not associated with an application installed on the computing device. This may, for example, enable the creation of a coupon from the notification. This coupon may then be stored on the computing device and/or in a digital wallet for easy access and dynamic verification and/or updates. Additionally, these coupons can be automatically redeemed based on a presence (e.g., at a store) of the computing device and communication with a point-of-sale terminal (e.g., via NFC) to apply the discount.

A notification may comprise, for example, a JSON dictionary and may comprise notification data and a recipient, i.e., a device identifier. The notification manager running on a computing device (e.g., native to operating system) may determine whether a notification is associated with an app that is installed on the device, based on an application identifier. The modification module may determine whether a notification received at the notification manager has fields with updatable and/or dynamic values, or whether the notification should be augmented with additional fields and/or icons. Such fields may be location fields, day and/or time fields, store hours fields and/or discount fields. An example of such a field includes "open for two more hours". The value of such fields is dynamic in the sense that the store closest to the computing device might be in one zip code if the computing device is located in or near such zip code in the morning, but the closest store might be in a second zip code if the computing device is present in or near such zip code in the afternoon.

Promotional notifications may be identified by the categorization module via different means. For example, the presence of promotional material could be signaled to the device in the JSON data structure (as an attribute). Similarly, if the notification is associated with an application installed on the computing device, then the application type (e.g., if the application is associated with a movie theater or a department store) can be used to determine whether the notification is promotional or not.

Figure 9:
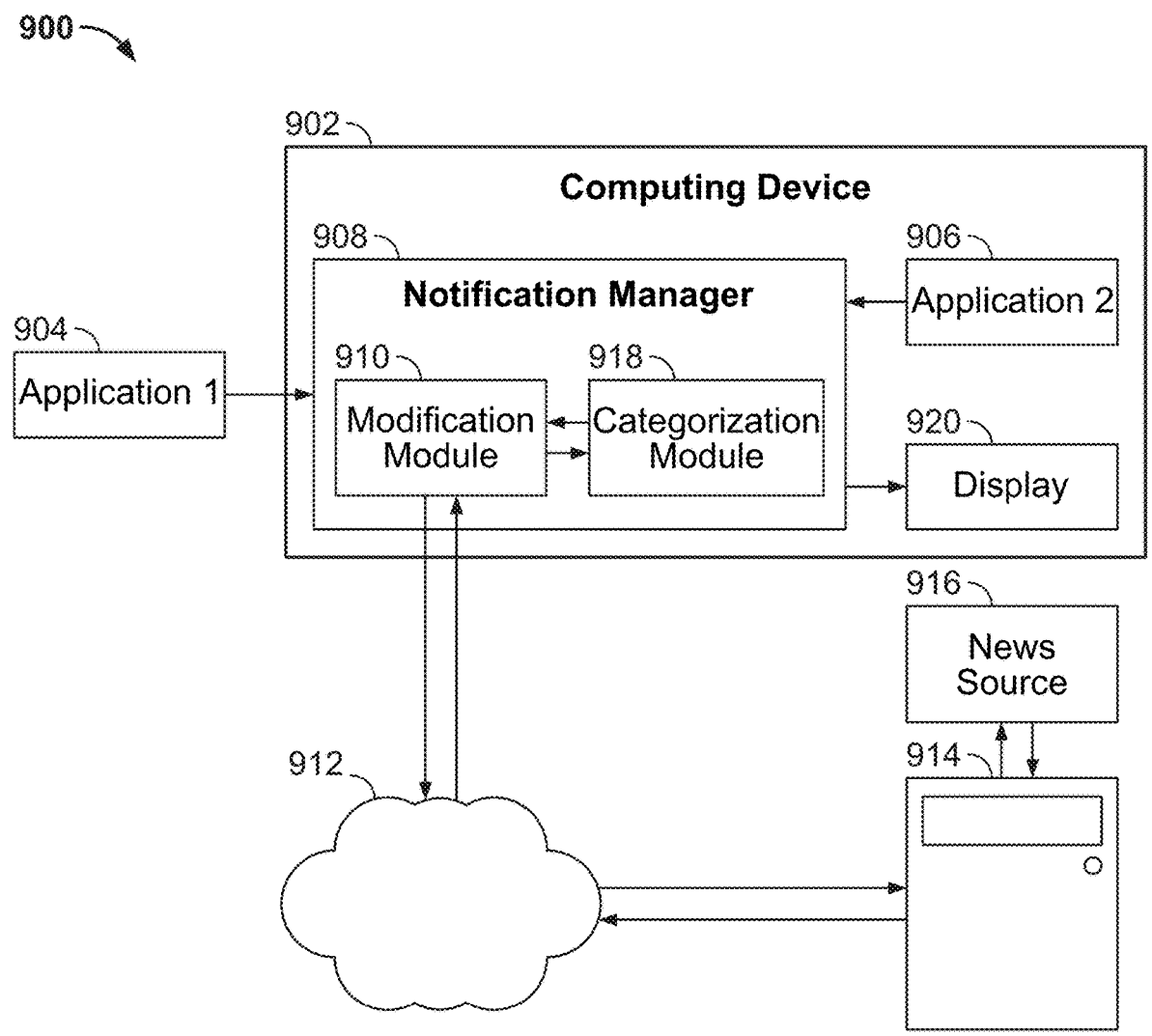
FIG. 9 shows another example environment in which a notification is modified to generate a modified notification, in accordance with some embodiments of the disclosure.

FIG. 9 shows another example environment in which a notification is modified to generate a modified notification, in accordance with some embodiments of the disclosure. In a similar manner to the environments depicted in FIGS. 1-8, the environment 900 comprises a computing device 902, a first application 904 and a second application 906. The computing device 902 comprises a notification manager 908, a modification module 910 and a display 920. In addition, the computing device 902 is in communication, via a network 912 (such as the internet), with a server 914. The server 914 comprises a news source database 916, and the notification manager comprises a categorization module 918. In a similar manner to the computing device 702 shown in FIG. 7, the computing device 902 categorizes a notification received from an application, for example, a news application. On categorizing a notification as, for example, "news," the modification module sends a query, via a network 912 (such as the internet), to determine a subscribable news source. The query may comprise a request to enable subscription to a single news source. In other examples, the query may comprise a request to enable subscription to a single story and/or headline. On receiving the request, the server 914 requests the data from the news source database 916. The server 914 transmits the requested data to the computing device 902, where it is passed to the modification module 910. The notification is modified to include a selectable icon and/or button that enables the user to subscribe, or follow, a news source, story and/or headline, such that they receive additional notifications related to the news source, story and/or headline. As before, the modified notification is generated for display and is displayed at a display 920 of the computing device 902. Related updates to a news story may be automatically added to a section (e.g., subscribed tab) within an application (e.g., a news app on the computing device 902).

Figure 10:
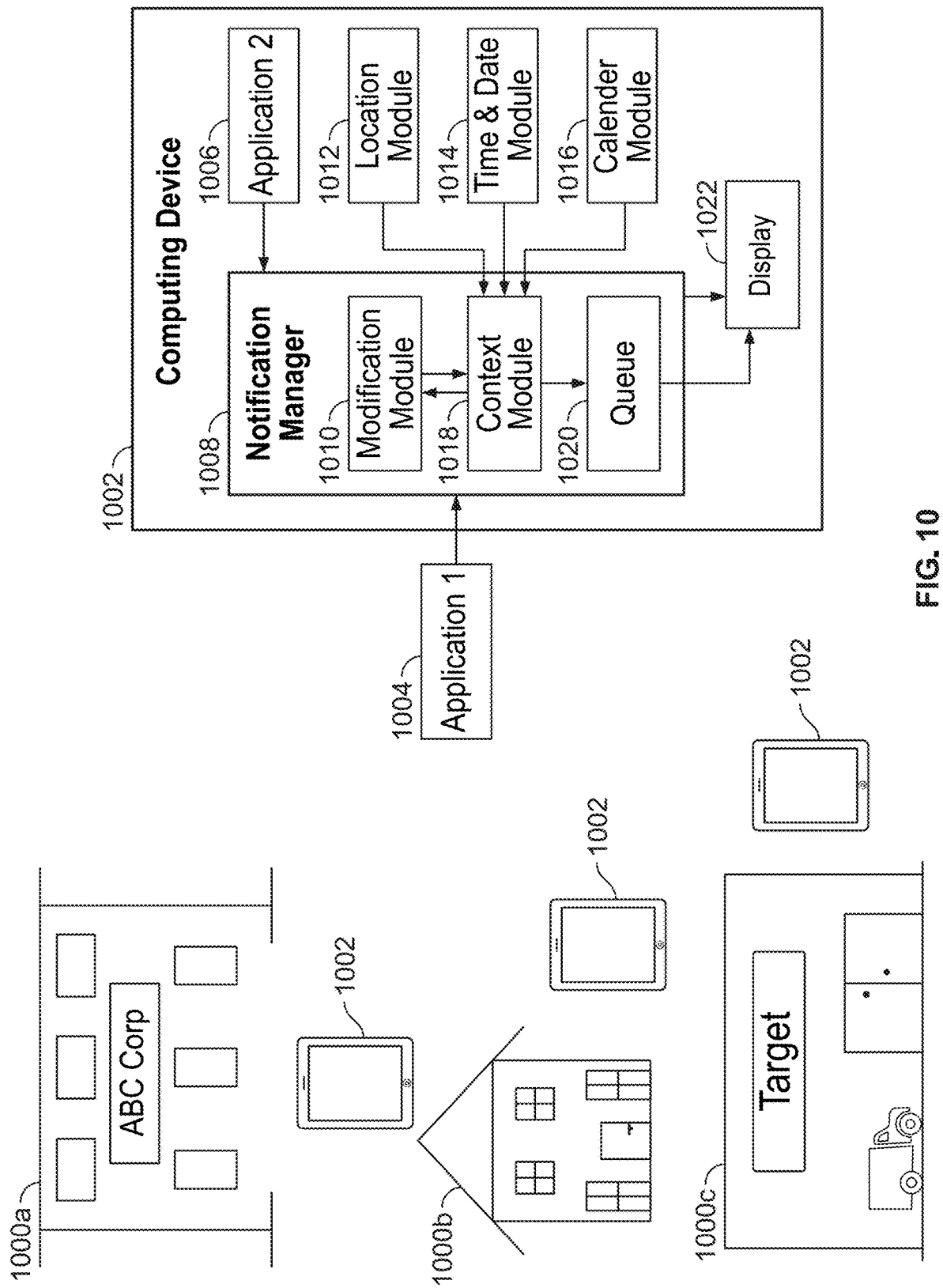
FIG. 10 shows another example environment in which a notification is modified to generate a modified notification, in accordance with some embodiments of the disclosure.

FIG. 10 shows another example environment in which a notification is modified to generate a modified notification, in accordance with some embodiments of the disclosure. A computing device 1002 may be associated with a context, such as a time of day and/or a location, such as work 1000*a*, home 1000*b* and/or a store 1000*c*. In a similar manner to the computing devices depicted in FIGS. 1-9, the computing device 1002 receives a notification from a first application 1004 external to the computing device 1002 or a second application 1006 running on the computing device. The computing device 1002 comprises a notification manager 1008, a modification module 1010 and a display 1022. In addition, the computing device comprises a location module 1012, a time and date module 1014 and a calendar module 1016, which are in communication with a context module 1018. The context module 1018 is in communication with a notification queue 1020. On receiving a notification from an application at the notification manager 1008, the notification is modified by the modification module 1010. The modified notification is passed to the context module 1018, where a context of the computing device is determined. The context module 1018 receives location data, time and date data and calendar data from the respective modules 1012, 1014, 1016. The context module determines, based on the determined context, whether to place a notification in a queue 1020, or to enable the notification manager 1008 to generate the notification for display and display the notification at a display 1022 of the computing device 1002. For example, if the modified notification relates to a promotion at a local store, the context module may place the notification in a queue until it determines that a context of the computing device is relevant to the promotion, for example, when a location generated by the location module 1012 of the computing device corresponds to a location of the store for which the promotion is valid.

In additional examples, a notification about a sale at "Target" might be pointless if presented to a user at work. The context module may determine this based, for example, on the computing device's presence at a particular location five days a week between the hours of nine and five. Such notification might be better suited to be displayed at the computing device when it is determined that the computing device is going to a Target store, or when a computing device is being used to create a shopping list, or in response to determining that the user might be going to Target (e.g., user receives a text message that mentions Target), all of which may be determined via the context module.

FIG. 11 shows an example modified notification, in accordance with some embodiments of the disclosure. A notification 1102 generated at a computing device 1100 may indicate that a movie is now on at a local cinema. In addition, the notification may include a link to directions to the local cinema. The notification 1102 may be modified to create a modified notification 1104, with the link removed and replaced with an address 1106 for the cinema and/or a map 1108 indicating a location of the cinema.

FIG. 12 shows another example modified notification, in accordance with some embodiments of the disclosure. A notification 1202 generated at a computing device 1200 may indicate a change in score associated with a game. The notification 1202 may be modified to create a modified notification 1204, with the modified notification 1204 including a button 1206 to enable the change in score to be viewed at the computing device 1200.

Figure 13:
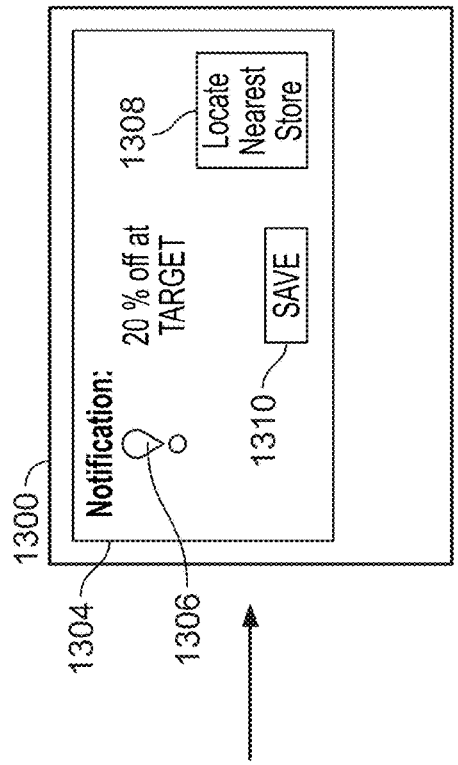
FIG. 13 shows another example modified notification, in accordance with some embodiments of the disclosure.

FIG. 13 shows another example modified notification, in accordance with some embodiments of the disclosure. A notification 1302 generated at a computing device 1300 may indicate a promotion associated with a store. The notification 1302 may be modified to create a modified notification 1304, with the modified notification 1304 including an icon 1306, a button 1308 to locate the nearest store, for example, by passing location data to a mapping application on receipt of input associated with the button. The modified notification 1304 may also include a button 1310 to save the promotion to a memory of the computing device 1300 on receipt of input associated with the button.

Figure 14:
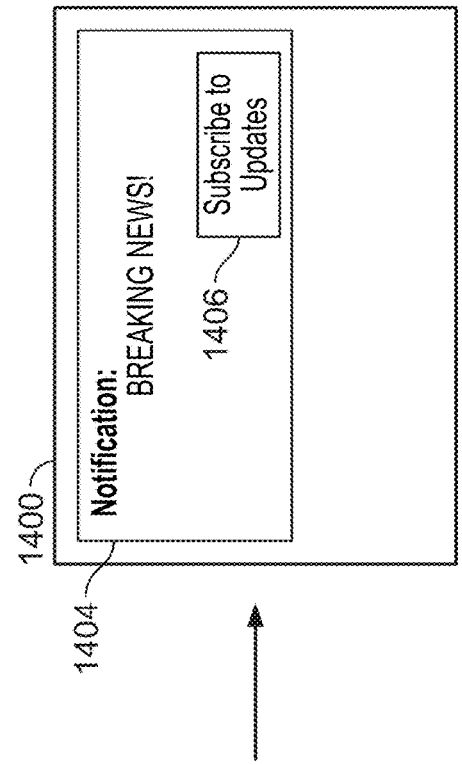
FIG. 14 shows another example modified notification, in accordance with some embodiments of the disclosure.

FIG. 14 shows another example modified notification, in accordance with some embodiments of the disclosure. A notification 1402 generated at a computing device 1400 may indicate a breaking news story. The notification 1402 may be modified to create a modified notification 1404, with the modified notification 1404 including a button 1406 to subscribe to updates to the story on receipt of input associated with the button.

FIG. 15 shows a block diagram representing components of a computing device and data flow therebetween for modifying a notification to generate a modified notification, in accordance with some embodiments of the disclosure. Computing device 1500 (e.g., computing device 102, 202, 302, 402, 502, 602, 702, 802, 902, 1000, 1100, 1200, 1300, 1400) as discussed above comprises input circuitry 1504, control circuitry 1508 and an output module 1522. Control circuitry 1508 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 1504. The input circuitry is configured to receive any notification as input. For example, this may include an application generating a notification on receiving a message, a smart watch transmitting data to a fitness application running on computing device 1500, that causes the fitness application to generate a notification and/or a notification received via a network, such as the internet.

The control circuitry 1508 comprises a notification manager module 1510, a notification modification module 1514 and a modified notification generation module 1518. The notification is received 1502 at the input circuitry 1504, where it is transmitted 1506 from the input circuitry 1504 to the notification manager module 1510. The notification manager module 1510 transmits 1512 the notification to the notification modification module 1514, where the notification is modified, thereby creating a modified notification. The modified notification is transmitted 1516 to the modified notification generation module 1518, where the modified notification is generated for display. The generated for display modified notification is transmitted 1520 to the output circuitry 1522 where it is displayed at the computing device via the display module 1524.

FIG. 16 shows a flowchart of illustrative steps involved in modifying a notification to generate a modified notification, in accordance with some embodiments of the disclosure. Process 1600 may be implemented on any of the aforementioned computing devices (e.g., computing device 102, 202, 302, 402, 502, 602, 702, 802, 902, 1000, 1100, 1200, 1300, 1400). In addition, one or more actions of the process 1600 may be incorporated into or combined with one or more actions of any other process or embodiments described herein.

At 1602, a notification is generated by an application running on a computing device. At 1604, the notification is received at a notification manager. At 1606, it is determined whether data is required from an external service to modify the notification. If data is required from an external service, at 1608, the computing device communicates, via a network such as the internet, with the external service to obtain the data. At 1610, it is determined whether a context of the computing device is required. If it is required, the context of the computing device is identified at 1612. At 1614, it is determined whether there are user preferences relevant to modifying the notification. If there are no relevant user preferences, then notification is modified at 1616 to include the data from the external service, if obtained, and based on the context of the computing device, if required. If there are relevant user preferences, then notification is modified at 1618 in accordance with the user preferences and to include the data from the external service, if obtained, and based on the context of the computing device, if required. At 1620, the modified notification is generated for display.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, at a notification manager being executed at least in part on a computing device, a notification associated with a user profile, wherein the notification is associated with a particular portion of a content item;
accessing subscription data corresponding to the user profile;
determining, based on the subscription data, whether the user profile is subscribed to a service associated with the content item;
based on determining that the subscription data indicates that the user profile is subscribed to the service, modifying the notification, at the notification manager, to include a link to the particular portion of the content item; and
transmitting the modified notification to a device associated with the user profile.

2. The method of claim 1, wherein:
the subscription data is for a sports service; and
the modified notification is for a sports game.

3. The method of claim 2,
wherein the modified notification is transmitted based on a change in a score of the sports game.

4. The method of claim 2,
wherein the link of the modified notification is selectable to cause a video clip of the particular portion of the sports game to be displayed at the device associated with the user profile.

5. The method of claim 1, wherein:
the notification indicates an action associated with the content item;
the notification manager receives, via a network, content timing data for the action; and
modifying the notification further comprises modifying the notification to enable an input to cause the particular portion of the content item associated with the action to be generated for display, wherein the particular portion is based on the received content timing data for the action.

6. The method of claim 1, wherein:
the notification manager receives, via a network, a token that enables the particular portion of the content item to be generated for display; and
modifying the notification further comprises modifying the notification to enable an input to cause the particular portion of the content item to be generated for display.

7. The method of claim 1, wherein:
the notification manager identifies a category associated with the notification; and
modifying the notification further comprises modifying the notification based on the category.

8. The method of claim 7, wherein:
the category is promotion;
the notification manager determines, via a network, a status of the promotion; and
in response to receiving an input, a copy of the promotion identified in the notification is stored in a memory.

9. The method of claim 1, wherein accessing the subscription data corresponding to the user profile comprises:

transmitting, to a subscription database, a request to access the subscription data, wherein the request comprises data identifying the user profile and the service associated with the content item; and receiving a response from the subscription database comprising the subscription data.

10. The method of claim 1, wherein modifying the notification further comprises:

modifying the notification to include a selectable icon linked to additional information associated with the content item, wherein in response to receiving a selection associated with the selectable icon:

transmitting the additional information associated with the content item to the device associated with the user profile; and storing a user preference corresponding to the user profile for at least one of: the content item, the additional information associated with the content item; or the service associated with the content item.

11. A system comprising:

a communication port;

a memory storing instructions; and control circuitry communicably coupled to the memory and the communication port and configured to execute the instructions to:

receive, at a notification manager being executed at least in part on a computing device, a notification associated with a user profile, wherein the notification is associated with a particular portion of a content item;

access subscription data corresponding to the user profile;

determine, based on the subscription data, whether the user profile is subscribed to a service associated with the content item;

based on determining that the subscription data indicates that the user profile is subscribed to the service, modify the notification, at the notification manager, to include a link to the particular portion of the content item; and transmit the modified notification to a device associated with the user profile.

12. The system of claim 11, wherein:
the subscription data is for a sports service; and
the modified notification is for a sports game.

13. The system of claim 12, wherein the modified notification is transmitted based on a change in a score of the sports game.

14. The system of claim 12, wherein the link of the modified notification is selectable to cause a video clip of the particular portion of the sports game to be displayed at the device associated with the user profile.

15. The system of claim 11, wherein:
the notification indicates an action associated with the content item;
the notification manager receives, via a network, content timing data for the action; and
the control circuitry is configured to modify the notification by modifying the notification to enable an input to cause the particular portion of the content item associated with the action to be generated for display, wherein the particular portion is based on the received content timing data for the action.

16. The system of claim 11, wherein:
the notification manager receives, via a network, a token that enables the particular portion of the content item to be generated for display; and
modifying the notification further comprises modifying the notification to enable an input to cause the particular portion of the content item to be generated for display.

17. The system of claim 11, wherein:
the notification manager identifies a category associated with the notification; and
modifying the notification further comprises modifying the notification based on the category.

18. The system of claim 17, wherein:
the category is promotion;
the notification manager determines, via a network, a status of the promotion; and
the control circuitry is configured to, in response to receiving an input, a copy of the promotion identified in the notification is stored in the memory.

19. The system of claim 11, wherein the control circuitry is configured to access the subscription data corresponding to the user profile by:

transmitting, to a subscription database, a request to access the subscription data, wherein the request comprises data identifying the user profile and the service associated with the content item; and receiving a response from the subscription database comprising the subscription data.

20. The system of claim 11, wherein the control circuitry is further configured to modify the notification by:

modifying the notification to include a selectable icon linked to additional information associated with the content item, wherein in response to receiving a selection associated with the selectable icon:

transmitting the additional information associated with the content item to the device associated with the user profile; and storing a user preference corresponding to the user profile for at least one of: the content item, the additional information associated with the content item; or the service associated with the content item.

* * * * *